(12) United States Patent
Goel et al.

(10) Patent No.: US 7,974,270 B2
(45) Date of Patent: Jul. 5, 2011

(54) MEDIA ROUTE OPTIMIZATION IN NETWORK COMMUNICATIONS

(75) Inventors: Puneet Goel, Mountain View, CA (US); Michael D. Gallagher, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 1627 days.

(21) Appl. No.: 11/222,529

(22) Filed: Sep. 9, 2005

(65) Prior Publication Data

US 2007/0058609 A1 Mar. 15, 2007

(51) Int. Cl.
*H04L 12/66* (2006.01)

(52) U.S. Cl. ........ 370/352; 370/329; 370/338; 370/401; 370/466; 455/67.11; 455/414.1; 455/435.1; 455/435.2; 455/509

(58) Field of Classification Search ............... 455/414.1, 455/421, 450, 509, 502, 67.11, 456.1, 437, 455/435.1; 370/341, 329, 352, 437, 338, 370/401, 466
See application file for complete search history.

(56) References Cited

U.S. PATENT DOCUMENTS

| | | | |
|---|---|---|---|
| 5,940,512 A | 8/1999 | Tomoike | |
| 5,995,500 A * | 11/1999 | Ma et al. | 370/337 |
| 6,119,000 A * | 9/2000 | Stephenson et al. | 455/432.1 |
| 6,236,852 B1 * | 5/2001 | Veerasamy et al. | 455/411 |
| 6,542,516 B1 | 4/2003 | Vialen et al. | |
| 6,553,219 B1 | 4/2003 | Vilander et al. | |
| 6,711,400 B1 | 3/2004 | Aura | |
| 6,801,772 B1 | 10/2004 | Townend et al. | |
| 6,826,154 B2 | 11/2004 | Subbiah et al. | |
| 6,842,462 B1 | 1/2005 | Ramjee et al. | |
| 6,845,095 B2 * | 1/2005 | Krishnarajah et al. | 370/349 |
| 6,925,074 B1 | 8/2005 | Vikberg et al. | |
| 6,937,862 B2 * | 8/2005 | Back et al. | 455/445 |
| 6,970,719 B1 | 11/2005 | McConnell et al. | |
| 7,009,952 B1 | 3/2006 | Razavilar et al. | |
| 7,441,043 B1 * | 10/2008 | Henry et al. | 709/238 |
| 2002/0075844 A1 | 6/2002 | Hagen | |
| 2003/0007475 A1 | 1/2003 | Tsuda et al. | |
| 2003/0130008 A1 * | 7/2003 | Rajaniemi et al. | 455/551 |
| 2003/0219024 A1 | 11/2003 | Purnadai et al. | |
| 2004/0053623 A1 | 3/2004 | Hoff et al. | |
| 2004/0116120 A1 | 6/2004 | Gallagher et al. | |

(Continued)

FOREIGN PATENT DOCUMENTS

WO WO 02/45456 A1 6/2002

(Continued)

OTHER PUBLICATIONS

U.S. Appl. No. 10/116,023, filed Apr. 2, 2002, Mohammed, Jahangir.

(Continued)

*Primary Examiner* — Kamran Afshar
*Assistant Examiner* — Babar Sarwar
(74) *Attorney, Agent, or Firm* — Adeli & Tollen LLP

(57) ABSTRACT

Media routes may be optimized in network communications, such a radio telephony communications networks. In one embodiment, the description includes identifying a first network controller corresponding to a first media communications client, identifying a second network controller corresponding to a second media communications client, determining whether the first and second network controller coincide, and if the first and second network controller coincide, then establishing a direct media communications connection between the first and the second client.

22 Claims, 7 Drawing Sheets

U.S. PATENT DOCUMENTS

| | | | |
|---|---|---|---|
| 2005/0063359 A1 | 3/2005 | Jagadeesan et al. | |
| 2005/0160161 A1* | 7/2005 | Barrett et al. | 709/223 |
| 2005/0286466 A1* | 12/2005 | Tagg et al. | 370/329 |
| 2006/0021036 A1* | 1/2006 | Chang et al. | 726/22 |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0098598 A1 | 5/2006 | Gallagher | |
| 2006/0166687 A1* | 7/2006 | Edman | 455/502 |
| 2006/0198347 A1* | 9/2006 | Hurtta et al. | 370/338 |
| 2006/0209799 A1 | 9/2006 | Gallagher et al. | |
| 2006/0276139 A1* | 12/2006 | Pummill et al. | 455/67.11 |
| 2007/0286132 A1* | 12/2007 | Vikberg et al. | 370/338 |
| 2008/0102801 A1* | 5/2008 | Lazaridis et al. | 455/414.1 |
| 2009/0075660 A1* | 3/2009 | Hallenstal et al. | 455/437 |
| 2009/0149157 A9* | 6/2009 | Gallagher et al. | 455/414.1 |

FOREIGN PATENT DOCUMENTS

| | | |
|---|---|---|
| WO | PCT/US2005/040689 | 8/2005 |
| WO | WO 2005107297 A1 | 11/2005 |
| WO | WO 2005114918 A3 | 12/2005 |
| WO | WO 2006/086756 | 8/2006 |

OTHER PUBLICATIONS

U.S. Appl. No. 11/004,439, filed Dec. 3, 2004, Gallagher, Michael.
U.S. Appl. No. 11/225,398, filed Sep. 12, 2005, Gallagher, Michael.
U.S. Appl. No. 11/225,871, filed Sep. 12, 2005, Gallagher, Michael.
U.S. Appl. No. 11/225,872, filed Sep. 12, 2005, Gallagher, Michael.
U.S. Appl. No. 11/226,610, filed Sep. 13, 2005, Gallagher, Michael.
U.S. Appl. No. 11/226,617, filed Sep. 13, 2005, Gallagher, Michael.
U.S. Appl. No. 11/227,573, filed Sep. 14, 2005, Gallagher, Michael.
U.S. Appl. No. 11/227,784, filed Sep. 14, 2005, Gallagher, Michael.
U.S. Appl. No. 11/227,840, filed Sep. 14, 2005, Gallagher, Michael.
U.S. Appl. No. 11/225,870, filed Sep. 12, 2005, Gallagher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
U.S. Appl. No. 11/068,445, filed Feb. 24, 2005, Rajeev Gupta et al.
U.S. Appl. No. 11/097,866, filed Mar. 31, 2005, Michael D. Gallagher et al.
Non-Final Office Action of U.S. Appl. No. 11/352,422, Dec. 30, 2008 (mailing date), Gallagher, Michael, et al.
International Search Report and Written Opinion for PCT/US2006/004970, Aug. 2, 2006 (mailing date), Kineto Wireless, Inc.
International Preliminary Report on Patentability and Written Opinion for PCT/US2006/004970, Aug. 14, 2007 (issuance date), Kineto Wireless, Inc.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
"3$^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*; ETSI TS 101 863-1 v1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 Technical Specification, Sep. 1, 2004, 29 pages.
"Unlicensed Mobile Access (UMA); Architecture (Stage 2);" UMA Architecture (Stage 2) R1.0.0 Technical Specification, Sep. 1, 2004, 78 pages.
"Unlicensed Mobile Access (UMA); Protocols (Stage 3);" UMA Protocols (Stage 3) R1.0.0 Technical Specification, Sep. 1, 2004, 142 pages.
"Unlicensed Mobile Access (UMA); Architecture (Stage 2);" UMA Architecture (Stage 2) R1.0.1 Technical Specification, Oct. 8, 2004, 80 pages.
"Unlicensed Mobile Access (UMA); Protocols (Stage 3);" UMA Protocols (Stage 3) R1.0.1 Technical Specification, Oct. 8, 2004, 142 pages.
"Unlicensed Mobile Access (UMA); Architecture (Stage 2);" UMA Architecture (Stage 2) R1.0.2 Technical Specification, Nov. 3, 2004, 79 pages.
"Unlicensed Mobile Access (UMA); Protocols (Stage 3);" UMA Protocols (Stage 3) R1.0.2 Technical Specification, Nov. 5, 2004, 142 pages.
"Unlicensed Mobile Access (UMA); Architecture (Stage 2);" UMA Architecture (Stage 2) R1.0.3 Technical Specification, Feb. 28, 2005, 85 pages.
"Unlicensed Mobile Access (UMA); Protocols (Stage 3);" UMA Protocols (Stage 3) R1.0.3 Technical Specification, Feb. 26, 2005, 156 pages.
"Unlicensed Mobile Access (UMA); Architecture (Stage 2);" UMA Architecture (Stage 2) R1.0.4 Technical Specification, May 2, 2005, 87 pages.
"Unlicensed Mobile Access (UMA); Protocols (Stage 3);" UMA Protocols (Stage 3) R1.0.4. Technical Specification, May 2, 2005, 162 pages.
"3$^{rd}$ Generation Partnership Project; Technical Specification Group GSM/EDGE Radio Access Network; Generic Access to the A/Gb interface; Stage 2 (Release X);" 3GPP TS 43.318 V0.3.0 (Jan. 2005), 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0 (Jan. 2005), 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0 (Jan. 2005), 66 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0 (Jan. 2005), 68 pages.

"3rd Generation Partnership Project; Technical Specification Group GSM/EDGE Radio Access Network; Generic Access to the A/Gb interface; Stage 2 (Release 6)" 3GPP TS 43.318 V6.1.0 (Jan. 2005), Apr. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.2.0 (Jun. 2005), 68 pages.

"Proposal for Stage 3 description for Generic Access to A/Gb interface", Tdoc GP-050279, Jan. 18, 2005, 1 page.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0 (Jan. 2005), 133 pages.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0 (Apr. 2005), 161 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0 (Apr. 2005), 160 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0 (Apr. 2005), 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0 (Apr. 2005), 146 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0 (Jul. 2005), 149 pages.

* cited by examiner

MEDIA ROUTE OPTIMIZATION IN NETWORK COMMUNICATIONS

FIELD

The present description pertains to the field of routing voice and media through communications networks, and, in particular, to routing voice and media to include or exclude a media gateway and switching center of the network.

BACKGROUND INFORMATION

UMA (Unlicensed Mobile Access) technology allows mobile and fixed clients to communicate with each other through nearby wireless access points. The mobile and fixed clients typically communicate with the access points using unlicensed frequencies, although a wired connection to an access point may also be used. The access points typically communicate with a larger telecommunications infrastructure using wired connections, such as an Internet connection, or using licensed frequencies, such those used for cellular telephony. In some implementations of UMA, a MSC (Mobile Switching Center) acts as an anchor for a call between two (or more) UMA clients. One or more media gateways are used to carry the call's traffic between the clients.

The MG (Media Gateway) of a mobile communications system has transcoding equipment capable of changing voice or data encoding or formatting. In, for example, a GSM base station subsystem, specialized media gateways (i.e., transcoder and rate adaptation units) are used to convert voice traffic from the coding and format of the cellular telephone to the PCM (Pulse Code Modulation) TDM (Time Division Multiplexed) format of the landline network. While this works well for mobile cellular telephones, it may introduce transcoding that is unnecessary for other types of terminals by first converting all voice traffic to the PCM TDM format of the network.

When two clients capable of running the same codec establish a VoIP call through a GSM system, the transcoding functions of the MG are not needed. Running the transport path through the MG consumes resources of the MG that may be applied to other calls. Any additional transcoding applied by the MG may also reduce the quality of the transport packets.

SUMMARY OF THE INVENTION

Media routes may be optimized in network communications, such as radio telephony communications networks. In one embodiment, the description includes identifying a first network controller corresponding to a first media communications client, identifying a second network controller corresponding to a second media communications client, determining whether the first and second network controller coincide, and if the first and second network controller coincide, then establishing a direct media communications connection between the first and the second client.

BRIEF DESCRIPTION OF THE DRAWINGS

The invention may be more fully appreciated in connection with the following detailed description taken in conjunction with the accompanying drawings, in which like reference numerals refer to corresponding parts throughout the several views of the drawings, and in which.

DETAILED DESCRIPTION

Introduction

In a communications system such as UMA (Unlicensed Mobile Access), a UMA client device (e.g., a mobile station) may be capable of opening an RTP (Real-Time Transport Protocol) port and operating on the media packets that it receives. If both clients to a call have this capability, and if there is a path through which the packets may be routed between the two clients, then there is no need to send the packets through a media gateway. The clients are capable of independently performing the operations normally performed by the media gateway. If the two clients are connected through the same UNC (UMA Network Controller), then a direct media connection may be established between the two clients that does not go through a media gateway. This frees the media gateway for other purposes.

To establish such a call, a switching entity, such as an MSC (Mobile Switching Center) may act as an anchor for the call and also decide whether to route packets through the media gateway or not. The MSC may also decide whether to optimize the routing during call set up or after call set up.

The call routing may be optimized in several different ways. In one example, a UNC issues a channel modify command to the UMA clients commanding them to change their media path. In another example, the UNC uses a SG (Security Gateway) to change the connections for media tunnels that connect the UMA clients. Once the packets have been rerouted to avoid a media gateway, they may also be re-routed again to include the media gateway. The MSC, for example, can remove the route optimization. Removing the route optimization may aid with hand-offs to other communication networks, such as cellular telephone networks, and to supplementary services.

Example UMA Architecture

Figure 1:
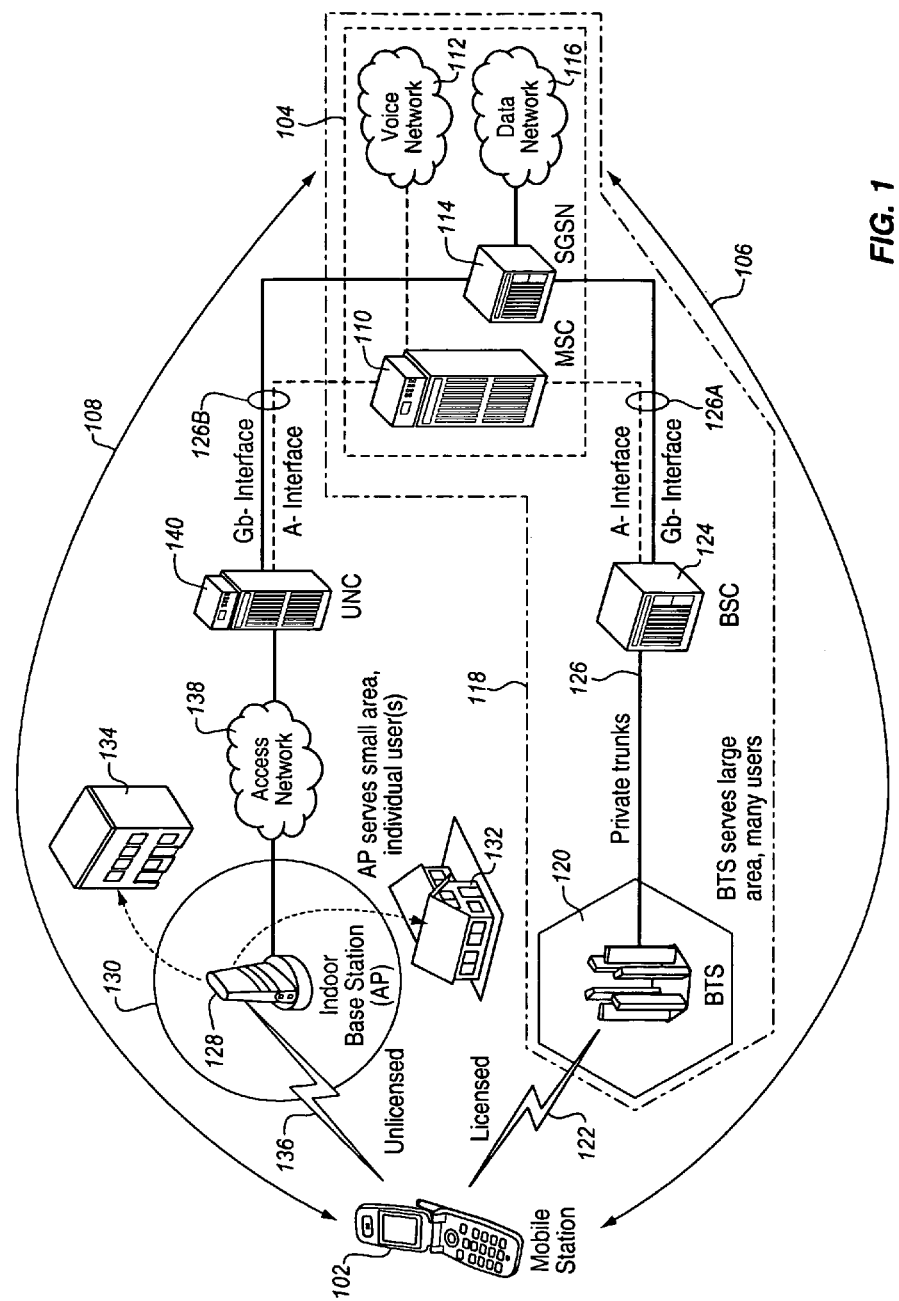
FIG. 1 provides an overview of an unlicensed mobile access (UMA) service solution to which an embodiment of the invention may be applied.

FIG. 1 illustrates an Unlicensed Mobile Access (UMA) architecture 100 in accordance with one embodiment of the present invention. The UMA architecture 100 enables a user of a MS 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function.

In further detail, the licensed wireless communication session is facilitated by infrastructure provided by a licensed wireless network 118 that includes a telecommunications network 104. In the illustrated embodiment, the licensed wireless network 118 depicts components common to a GSM (Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively coupled to its BSC 124 via a private trunk 126. In general, a large licensed wireless network, such as that provided by a regional or nationwide mobile services provider, will include multiple BSCs 124.

Each BSC 124 communicates with the telecommunications network 104 through a standard base station controller interface 126. For example, a BSC 124 may communicate with an MSC 110 via the GSM A-interface for circuit switched voice services and with the SGSN 114 via the GSM Gb interface for packet data services (GPRS). Conventional licensed voice and data networks 104 include protocols to permit seamless handoffs from one recognized BSC 124 to another BSC (not shown). The MSC may be a conventional MSC or a softswitch-based MSC. A softswitch-based MSC may include a MSC Call Server and a Media Gateway.

An unlicensed communication session 108 is facilitated via an (wireless or wired) access point (AP) 128 comprising an indoor base station 130. Typically, the AP 128 will be located in a fixed structure, such as a home 132 or an office building 134. The service area of the indoor base station 130 includes an indoor portion of a building, although it will be understood that the service area of an indoor base station may include an outdoor portion of a building or campus. As indicated by the arrow representing the unlicensed communication session 108, the MS 102 may be connected to the telecommunications network 114 via a second data path that includes an unlicensed wireless channel 136, an access point 128, an access network 138, and an unlicensed mobile access network controller (UNC) 140. The UNC 140 communicates with the telecommunications network 104 using a base station controller interface 126B that is similar to the UNC's base station controller interface 126A, and includes a GSM A interface and Gb interface. The indoor base station 128 and the indoor network controller 132 may include software entities stored in memory and executing on one or more microprocessors (not shown in FIG. 1) adapted to perform protocol conversion.

The indoor base station 128 and the UMA network controller 140 may also include software entities stored in memory and executing on one or more microprocessors (not shown in FIG. 1) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting the unlicensed wireless channel 136 may have an associated communication protocol. As examples, the unlicensed wireless service may be a Bluetooth® compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP).

Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, now issued U.S. Pat. No. 6,922,559, the contents of which are hereby incorporated by reference.

Figure 2:
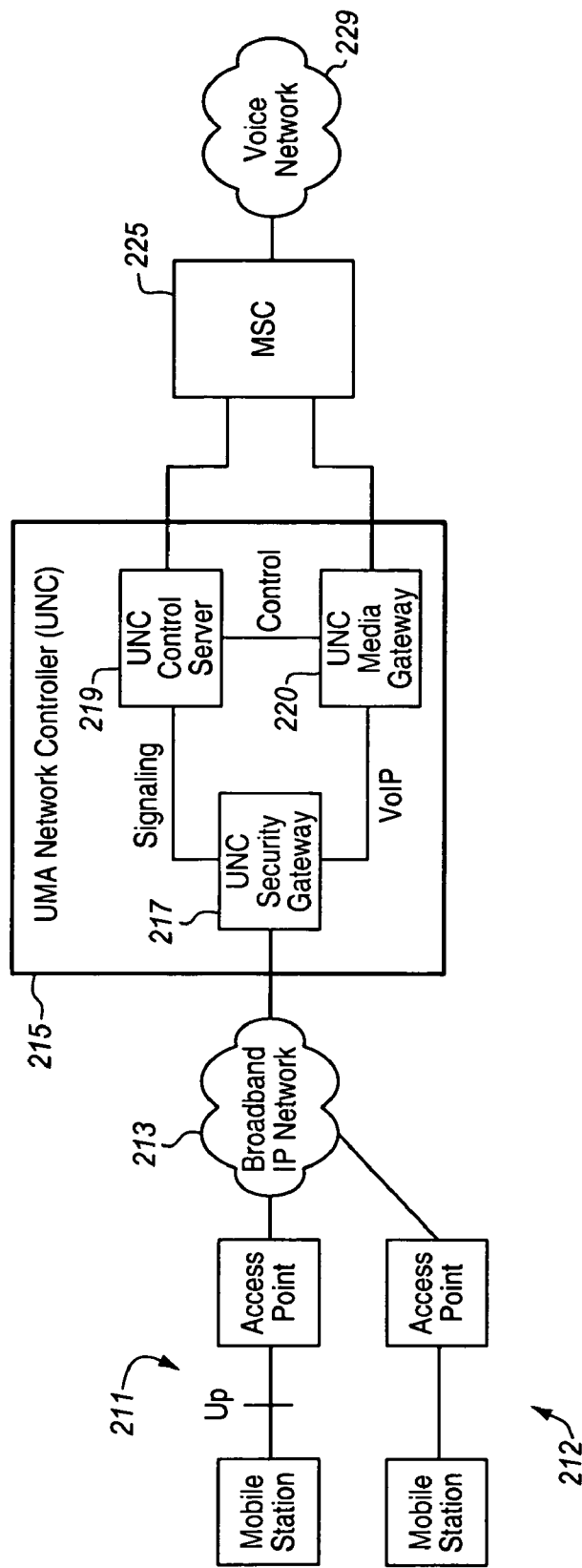
FIG. 2 illustrates additional detail for the UMA network controller (UNC) of FIG. 1 to which an embodiment of the invention may be applied.

FIG. 2, shows a conventional context for a UNC and MSC in a UMA system architecture. As shown in FIG. 2, customer premises equipment (CPE) 211 is coupled through a broadband access network 213, such as a wide area network or the Internet to a UNC 215. In the example of FIG. 2, the CPE is shown as a mobile station, such as a wireless or mobile phone shown as 102 in FIG. 1, coupled through an Up radio interface to a wireless access point (AP) shown as 128 in FIG. 1. A variety of types of CPE implementations may be used instead of the MS, AP combination shown. For example an IBS (Indoor Base Station), a VoIP (Voice over Internet Protocol) telephony modem, a UMA (Universal Mobile Access) modem or a private IP branch exchange may be used. A second CPE 212 is also coupled through the broadband access network to the UNC. Users of the two mobile stations may communicate with each other and with others through the network 213. The mobile stations may use the same or different access points.

The UNC, which may be similar to the UNC shown as 140 in FIG. 1, is shown as including a security gateway 217 to terminate the secure tunnel between the MS and the UNC. The security gateway is coupled to a control server 219 and to a media gateway 220. The security gateway may be a part of the UNC as shown, or it may be a separate component. The control server handles signaling with a MSC 225. In one embodiment, the UNC emulates a BSC (Base Station Controller) and uses signaling protocols, such as A interface protocols designed for communication between an MSC and a BSC. The UNC may also include other components depending on the particular implementation. The MSC performs switching operations and couples calls through the voice and multimedia network 229.

Example Signaling Transactions

For each active MS (Mobile Station) served by a MSC and hosted by a UNC, there may be a unique SCCP connection between the MSC and the UNC. An SCCP connection is typically established at the start of the session (e.g., a call) and is released at the end. Hence, any message flowing between the MSC and the UNC can be uniquely attributed to a MS.

Figure 3:
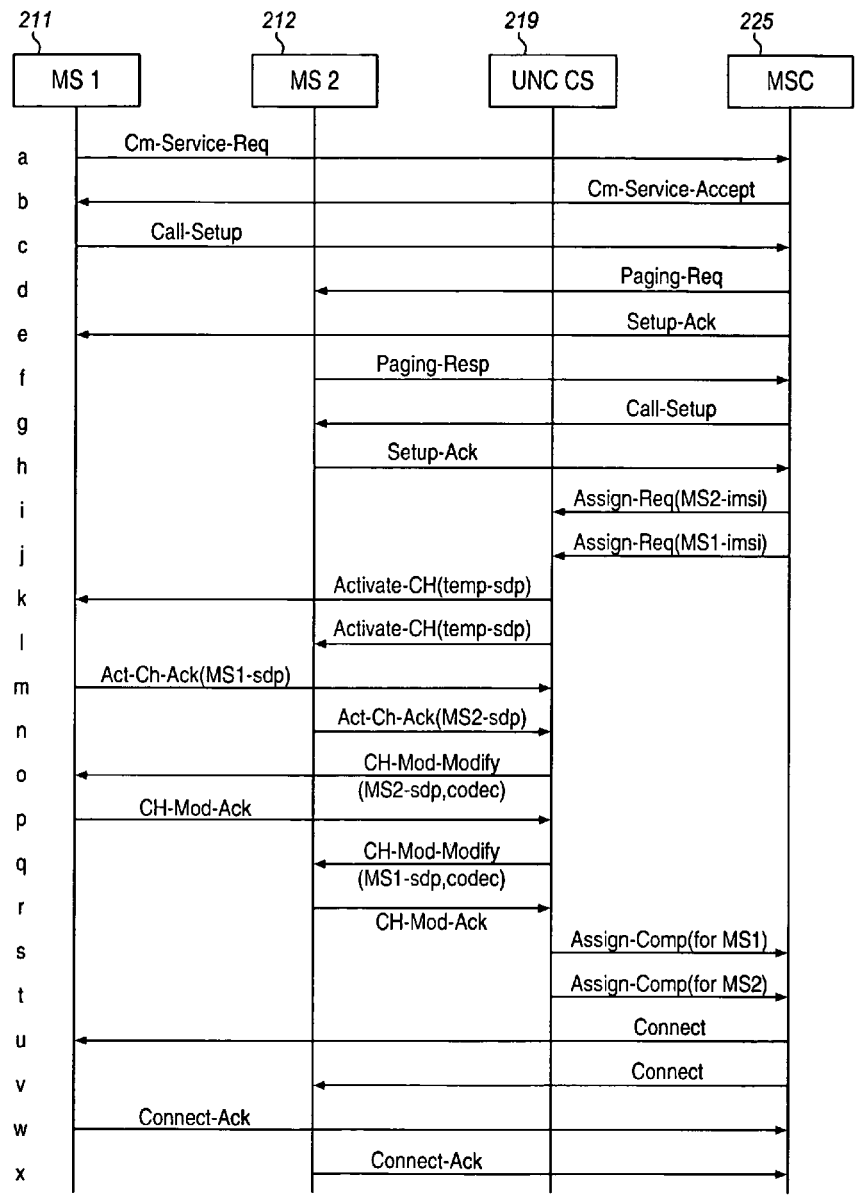
FIG. 3 is a message and data flow diagram illustrating messages and operations employed to optimize the routing of media during call establishment for a call hosted by a single UNC according to an embodiment of the invention.

FIG. 3 shows an example of optimizing the routing of an RTP VoIP call during call set up. FIG. 3 shows an example of a procedure associated with successfully establishing a voice channel connection between a first MS (Mobile Station) 211 and a second MS 212. The connection is optimized for MS1 and MS2 by being routed to avoid a UNC media gateway (220 from FIG. 2) and the MSC 225. FIG. 3 also shows the participation of the UNC in sending messages to the two MSs.

In FIG. 3 at line A, MS1 211 sends a CM Service Request (CM-Service-Req) to the MSC 225. At Line B, the MSC responds by accepting the CM service Request (CM-Service-Accept) and at line C the call set up procedure starts with a Call SetUp message (Call-Setup) from MS1 to the MSC. The Call Setup message at line C includes an identification of a second mobile station (MS2) 212 with which MS1 would like to connect. At the call setup stage, line C, the MSC knows that both mobiles MS1 and MS2 are hosted by the same UNC 215. As a result, the MSC may apply optimization during the channel assignment procedure. The MSC 225 continues with the call set up by sending a Paging Request (Paging-Req) at line D to MS2 212, and a Set-up Acknowledgment (Setup-Ack) at line E to MS1. MS2 responds at line F with a Paging Response (Paging-Resp). The MSC, at line G, sends a Call Setup message (Call-Setup) and at line H, MS2 sends a Setup Acknowledgement (Setup-Ack) back to the MSC.

Having responded to each MS's setup request, MSC may then request that the UNC assign voice channels. To do so with route optimization, an Assignment Request (Assign-Req) for MS1 is sent to the UNC at Line I with the IMSI (International Mobile Station Identification) of MS2. Similarly an Assignment Request for MS2 is sent to the UNC at line J with MS1's IMSI. To do this, the Assignment Request may contain a new optional parameter to hold the other party's IMSI. An example of a suitable Assignment Request message is as follows:

| Information Element | Type | Length in Bytes |
| --- | --- | --- |
| Message Type | M | 1 |
| Channel Type | M | 5-10 |
| Layer 3 Header Information | O | 4 |
| Priority | O | 3 |
| Circuit Identity Code | O | 3 |
| Downlink DTX Flag | O | 2 |
| Interference Bend to be used | O | 2 |
| Classmark Information 2 | O | 4-5 |
| Group Call Reference | O | 3-8 |
| Talker Flag | O | 1 |
| Configuration Evolution Indication | O | 2 |
| LSA Access Control Suppression | O | 2 |
| Service Handover | O | 3 |
| Other MS IMSI | O | 3-10 |

Through to line H, the call set up process has been conventional in that it resembles that set forth in the standards for UMA. At line K, the UNC sends a conventional Activate Channel Request (Activate-CH) to MS1 211, however, whereas in a conventional Activate Channel message the SDP (session description protocol) description would include the IP port and address of a media gateway that will be used for the call, in this case a temporary port is assigned. The purpose of sending an Activate Channel Request by the UNC to a mobile station is to obtain in return an Activate Channel Acknowledgement (Act-CH-Ack) at line M from MS1. This Active Channel Acknowledgement contains the SDP for MS1. Similarly, the UNC also sends an Activate Channel Request at Line L to MS2 that also includes a temporary port. This may be the same or different SDP. MS2 then responds with its own Activate Channel Acknowledgement at line N which contains the SDP for MS2. The UNC now has SDPs providing the IP port and address for both the first and second mobile stations. Using that information it can set up a call directly between MS1 and MS2 without using a media gateway.

At Line O, a Channel Mode Modify Request (CH-Mode-Modify) is sent from the UNC to MS1 and this time it modifies the channel to connect to MS2 directly providing the SDP from MS2 that was received at Line N. MS1 sends a Channel Modify Acknowledgement (CH-Mode-Ack) message at Line P. Similarly, the UNC sends a Channel Mode Modify message at Line Q to MS2. This message requests MS2 to modify its channel to connect directly with MS1 and includes the SDP from MS1. At Line R, MS2 sends a Channel Mode Acknowledgement back to the UNC.

Having established the channels to both of these mobile stations, the UNC at Line S may send an Assignment Complete (Assign-Comp) message for MS1 and at Line T may send an Assignment Complete message for MS2 both to the MSC. With the assignments complete, the MSC at Lines U and V may send connection (Connect) messages to MS1 and MS2, respectively. These are acknowledged (Connect-Ack) at Lines W and X. Upon obtaining the acknowledgements, the channels are complete and set up. The media now is routed directly between MS1 and MS2 which are both assigned to the same UNC. In the example of FIG. 3, after optimization, the call does not go through the media gateway 220, although in accordance with UMA requirements it will still go through the MSC switching fabric 225, 229.

Figure 4:
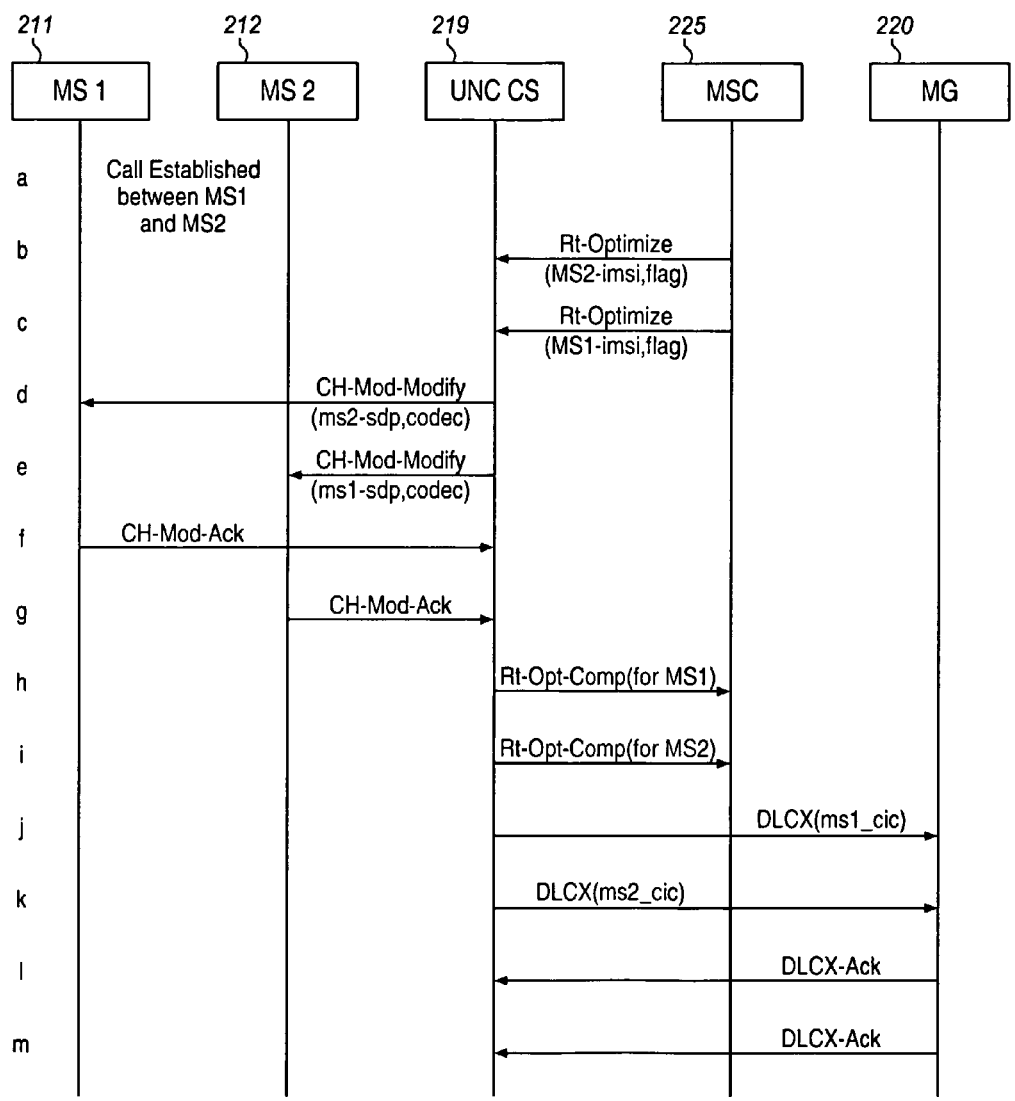
FIG. 4 is a message and data flow diagram illustrating messages and operations employed to optimize the routing of media for an already established call hosted by a single UNC according to an embodiment of the invention.

FIG. 4 shows an example of optimizing routing between a first and a second mobile station after a call has already been set up. In this example, the UNC uses standard UMA messages for CH-Mod-Modify to achieve this. There is also a possibility with the CH-Mod-Modify message to change the codec for the channel to the highest voice quality available with the new optimized route.

As shown in FIG. 4, a call has already been established at Line A with the traffic packets (RTP) routed through a media gateway 220 and the MSC 225. This may occur because the mobile stations are initially hosted by different UNCs. This may occur because a mobile station is initially communicating through a cellular or other wireless system and then is handed over to a UMA system through a UNC. This may occur because calls for the system are always initially established through a media gateway by default. Such a default may permit calls to be established quickly, then the route may be optimized after an investigation of the host UNCs. In another example, calls are established as shown in FIG. 3 when a single UNC host is involved. Calls may then be rerouted to exclude the media gateway when UNC hosts are changed either due to movement or handover or due to later optimization routines.

In FIG. 4 at Line A, a call is established between a first and a second mobile station (MS1, MS2). In this established call, media is processed through the media gateway 220 and MSC 225. The MSC then becomes aware that media traffic routing may be optimized because both mobile stations are hosted by the same UNC. It may then at Line B send a Route Optimize message (RT-Optimize) to the UNC for MS1 with MS2's IMSI and at Line C a Route Optimize message to MS2 with MS1's IMSI. This Route Optimize message is not defined in UMA standards but may be expressed in a variety of different ways. In one example, the Route Optimize message contains the following fields:

| Information Element | Type | Length in Bytes |
| --- | --- | --- |
| Message Type | M | 1 |
| Other MS IMSI | M | 3-10 |
| Flag | O | 1 |

The MSC uses a Flag parameter in the Route Optimize message to indicate to the UNC whether the connection to the Media Gateway should be deleted after the optimization is complete. The UNC may store information such as MS1-SDP and MS2-SDP which makes this optimization successful. In response to the Route Optimize message, the UNC may send a Channel Mode Modify message (CH-Mod-Modify) to MS1 at Line D. This Channel Mode Modify message may contain the SDP for MS2. Similarly, at Line E, the UNC may send a Channel Mode Modify message to MS1 containing the SDP for MS1. These Channel Mode Modify messages at lines D and E may also include a field to indicate a change of a codec. Such a change may be desired, for example, if changing from a route through the media gateway to a direct route allows for a higher quality codec to be used. At Lines F and G the first and second mobile stations reply to the UNC with a Channel Mode Modify Acknowledgment (CH-Mod-Ack) and at Lines G and H, the UNC responds to the MSC with a Route Optimization Complete message (Rt-Opt-Comp). The Route Optimization Complete message is also not defined in any known standards and may be expressed in a variety of different ways. One example of a Route Optimization Complete message is as follows.

| Information Element | Type | Length in Bytes |
|---|---|---|
| Message Type | M | 1 |
| Response Flag (Contains Success or Failure) | M | 1 |

If "flag" is set in the route optimize message, the connection to the media gateway may be cleared. So at lines J-K, the UNC sends a Delete Connection message (DLCX) to the media gateway, identifying the MG connection associated with MS1. At Lines L and M the media gateway responds to both of these messages with corresponding Delete Connection Acknowledgements (DLCX-Ack). This completes the route optimization and the established call at Line A is now rerouted to exclude the media gateway and bypass the MSC.

Figure 5:
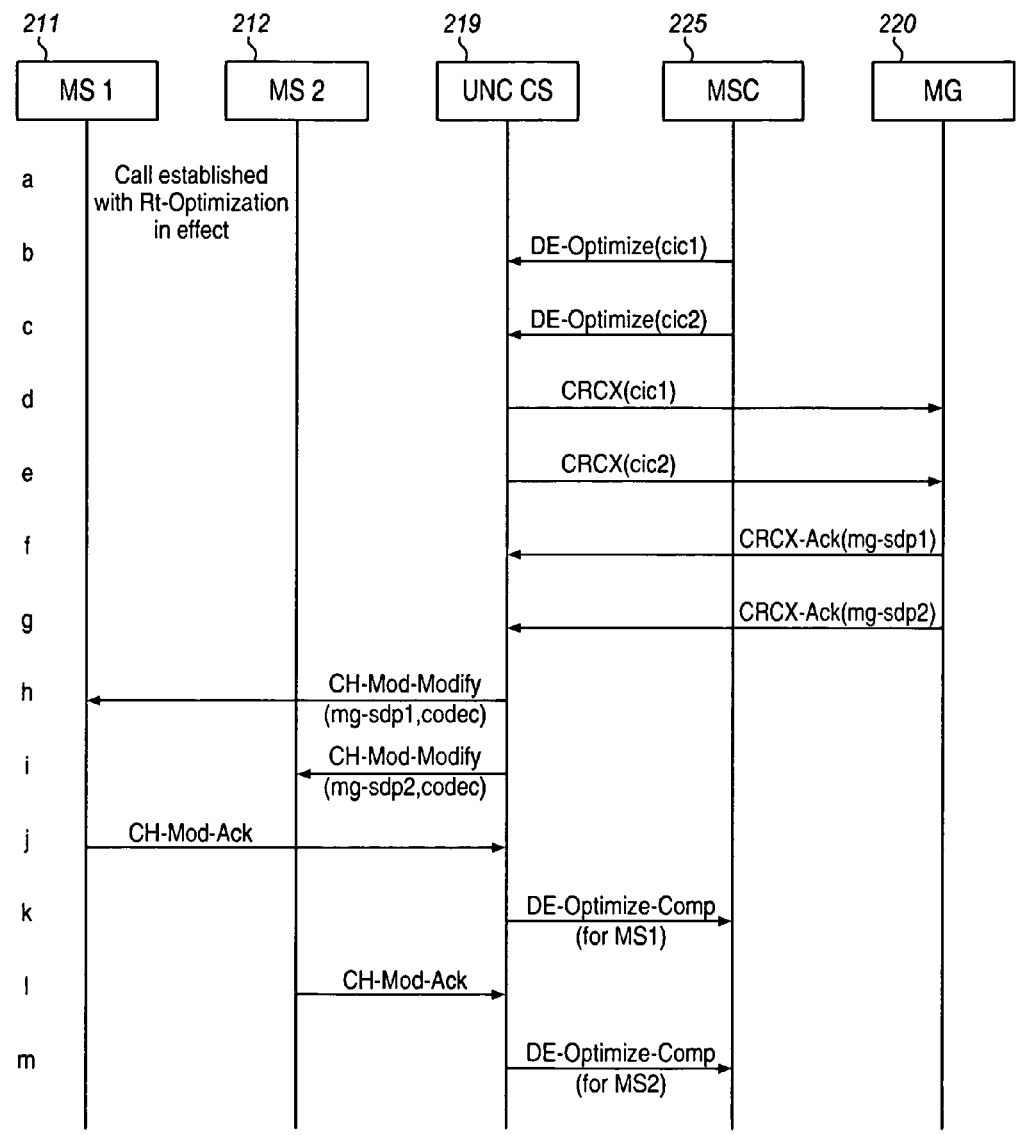
FIG. 5 is a message and data flow diagram illustrating messages and operations employed to reroute media though a media gateway for an established call according to an embodiment of the invention.

It may occur that after a direct connection between two mobile stations is established it may be necessary to reroute the call back through a media gateway. A process for doing this is shown in FIG. 5. A call may require rerouting for example if one of the mobile stations is in the process of being redirected to another UNC or if one of the mobile stations is in the process of handing off to a mobile communication system such as a cellular telephone communication system. The system may be rerouted through the media gateway to support supplementary services such as three-way calling or certain types of messages which are not supported by either one or the other of the mobile stations.

As shown in FIG. 5 at Line A, a call has been established with route optimization in effect. As a result, traffic is routed between MS1 and MS2 directly, bypassing the media gateway and the MSC. At Line B, the MSC determines that the route optimization must be removed. As a result, the MSC sends a De-optimize message (DE-Optimize) for MS1 to the UNC at Line B and for MS2 to the UNC at Line C. The De-Optimization message contains a circuit identity code (CIC) in order to set up voice path through Media Gateway. This De-Optimization message is not defined in any known standards but may be expressed in a variety of different ways. An example of such a message is shown as follows.

| Information Element | Type | Length in Bytes |
|---|---|---|
| Message Type | M | 1 |
| Circuit Identity Code | M | 1 |
| Flag | O | 1 |

At line D, the UNC responds with a Create Connection message (CRCX) sent from the UNC to the media gateway, this will include the CIC (circuit identification code) for MS1. Similarly, at Line E a Create Connection message with the circuit identification code for MS2 is sent to the media gateway. The media gateway at Lines F and G responds with an acknowledgement (CRCX-Ack), this acknowledgement includes the SDP for the first (line F) and second (line G) mobile stations to connect to the media gateway. The UNC uses this information to then at Lines H and I send a Channel Mode Modify message to the first and second mobile stations. The Channel Mode Modify messages include the SDP for connecting to the media gateway, which was provided by the media gateway. At Line J, MS1 acknowledges the Channel Mode Modify message to the UNC. The UNC then, at line K, may send a De-Optimize Complete message (DE-Optimize-Comp) for MS1 to the MSC. This De-Optimization Complete message may be expressed in a variety of different ways, one example of which is shown as follows.

| Information Element | Type | Length in Bytes |
|---|---|---|
| Message Type | M | 1 |
| Response Flag (contains Success or Failure) | M | 1 |

At Line L, MS2 sends a Channel Mode Modify Acknowledgement message and at Line M the UNC sends a De-Optimize Complete message for MS2 to the MSC. At the end of this set of messages the call is now established through the media gateway with MS1 connecting through the IP Port and address provided by the media gateway as its SDP in its create connection acknowledgement message. MS2 connects to the media gateway with an IP Port and address provided by the media gateway for its channel.

Figure 6:
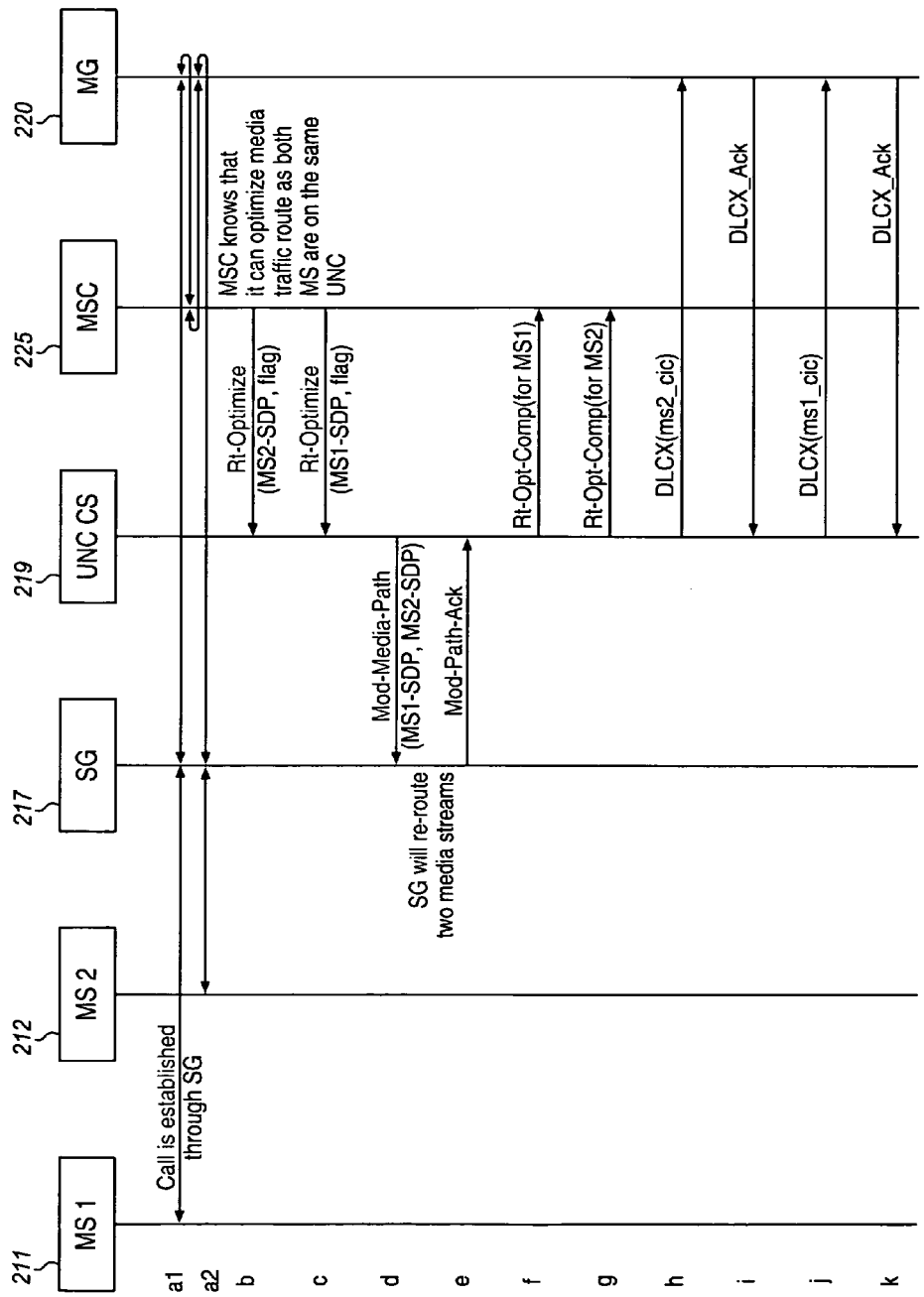
FIG. 6 is a message and data flow diagram illustrating messages and operations employed to optimize the routing of media for an established call connected through a security gateway according to an embodiment of the invention.

FIG. 6 shows a set of messages that may be used when a security gateway is used either as a part of the UNC or as a separate component. The security gateway, as described in more detail below, provides a secure tunnel through the broadband IP network 213 between a mobile station and a UNC. In one example the SG is within the UNC. In another embodiment, the SG is outside of the UNC as an associated or as a separate component. The messages of FIG. 6 achieve route optimization after a call has been set up. The UNC uses the SG to achieve this. An instruction is issued to the SG to cross connect two media streams going to different ports on the MG instead of sending them to the MG. The UNC may optionally choose to change the codec if better voice quality is possible In FIG. 6 at Lines A1 and A2, a call is established between MS1 and MS2 through a security gateway 217. This is indicated in FIG. 6 as a SG (Security Gateway). The SG allows MS1 and MS2 to talk securely through an open network using IPSec or any other type of tunneling or encryption system. Similar to FIG. 4, the MSC then determines that the media traffic route may be optimized because MS1 and MS2 are hosted by the same UNC 215.

As in FIG. 4 at Lines B and C, a route optimization message may be sent from the MSC to the UNC for MS2 and MS1, respectively. However in contrast to FIG. 4, the UNC then sends a Modify Media Path message (Mod-Media-Path) to the SG at Line D. This message includes an SDP (Session Description Protocol) description for both MS1 and MS2. The SG may then connect the media streams and send a Modify Path Acknowledgement (Mod-Path-Ack) at Line E. Since all traffic between MS1 and MS2 flows through the SG, the mobile stations need not be aware that the route optimization has been performed. In the originally established call, media traffic traveled between the mobile stations and the SG and media traveled from the SG to the media gateway 220 then to the MSC and back. In the optimized route, the media will be passed directly through the SG between mobile stations 1 and 2. One way of defining a Modify Media Path message between a UNC and a SG is as follows

| Information Element | Type | Length |
| --- | --- | --- |
| Message Type | M | 1 |
| SDP-1 | M | 8 |
| SDP-2 | M | 8 | where the SDP structure is:

| Information Element | Length |
| --- | --- |
| IP Address | 7-19 |
| Sample Size | 3 |
| RTP Port | 4 |
| Payload Type | 3 |
| RTCP Port | 4 |

At Lines F and G, the UNC having received an acknowledgement from the SG may send a Route Optimized Complete message for both MS1 and MS2 to the MSC. The UNC may then, at Line H, send a Delete Connection message to the media gateway from MS2 providing its CIC (circuit identification code). The media gateway may reply at Line I with a Delete Connection Acknowledgement. Similarly at Line J, a Delete Connection message is sent from the UNC to the media gateway for MS1 and this message is acknowledged at Line K. An Acknowledgement message from the SG may be formatted as follows:

| Information Element | Type | Lenth |
| --- | --- | --- |
| Message Type | M | 1 |
| Response Flag (Success or Failure) | M | 1 |

After the authorization of the media traffic route is completed the UNC may determine that a better codec rate may be used and a Channel Mode Modify message to MS1 and MS2 may be provided to increase the codec or change a codec from the existing connection. As an alternative the MSC may decide to not release the CICs as shown by Lines H, I, J and K. The decision not to release the CICs may be indicated by the MSC to the UNC by adding a flag parameter to the Route Optimization messages at Lines B and C.

Figure 7:
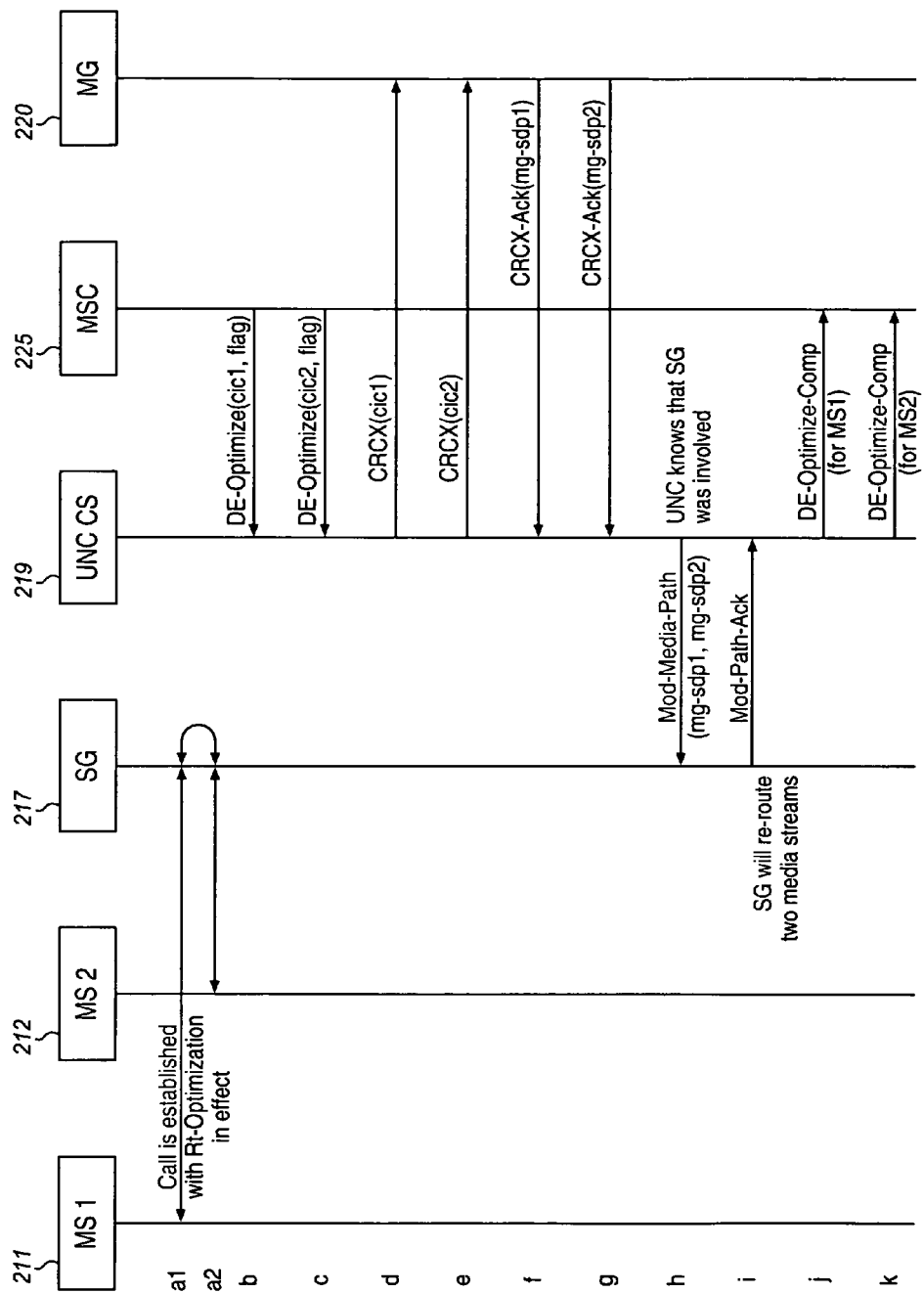
FIG. 7 is a message and data flow diagram illustrating messages and operations employed to reroute media through a media gateway for an established call connected through a security gateway according to an embodiment of the invention.

FIG. 7 shows how to remove the route optimization and again connect UMA mobiles through a Media Gateway using the SG. FIG. 7 shows an example of messages to eliminate the route optimization of FIG. 6 as a change in host UNC or a change in the desired services occurs. In FIG. 7, at Lines A1 and A2, a call is established between MS1 and MS2 through the security gateway 217 but with an optimized route that does not include the media gateway 220. If one of the mobile stations wants to hand off to a cellular telephone system or supplementary services like three way calling are to be supported or if other types of media which are not supported both by media station 1 and 2 are desired then the route optimization may be removed.

As in FIG. 5, at Lines B and C a De-Optimization message is sent from the MSC to the UNC for MS1 and MS2 respectively. At Lines D and E a Create Connection message with CICs for the first and second mobile stations are sent from the UNC to the media gateway. At Lines F and G, the media gateway acknowledges these Create Connection messages.

As in FIG. 6, the MSC may decide not to use new CICs if these have not been deleted before during the optimization. As shown in FIG. 6, the MSC may include a flag in its route optimization message to the UNC signaling that the connection with the MG not be deleted and the CICs remain valid. These old CICs are retained and may then be reused when the media traffic is rerouted through the MG. In this case, the Cross Connect messages at Lines D thru G are no longer necessary. The UNC simply refers to the old CICs from before the route optimization. In either event, at Line H, the UNC sends a Modify Media Path message (Mod-Media-Path) to the security gateway and the security gateway sends a Modify Path Acknowledgement back to the UNC at Line I. The security gateway then reroutes the two media streams to include the media gateway using the SDPs either from the original route or as obtained from the create connection signaling at Lines D thru G. Having received the acknowledgement at Line I, the UNC may then send a De-Optimize Complete message at Line J to the MSC for MS1 and at Line K for MS2. The established call has now been rerouted to pass all media through the media gateway 220 and the MSC 225. After this has been established, the UNC may send Channel Mode Modify messages to mobile stations 1 and 2 to change codec or codec rates.

As may be understood from the description above, there are two aspects of route optimization that may be addressed by the invention: (1) the call path does not go through the UNC media gateway, and (2) the call path does not go through the MSC switching fabric (the MSC may be either be a conventional, monolithic switch or a softswitch consisting of a MSC call server and a media gateway. Either one or both of these aspects may be supported in any particular application. This is in contrast to conventional UMA call routing in which the call path always goes through a UNC media gateway and the MSC switching fabric. Re-routing the call frees resources on the MG and MSC. It may also allow for higher rate coding, i.e. higher voice quality, than the MG supports.

General Matters

Embodiments of the present invention may be provided as a computer program product which may include a machine-readable medium having stored thereon instructions which may be used to program a control station, a microcontroller or other electronic device to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, embodiments of the present invention may also be downloaded as a computer program product, wherein the program may be transferred from a remote computer or controller to a Requesting computer or controller by way of data signals embodied in a carrier wave or other propagation medium via a communication link (e.g., a modem or network connection).

In this description, numerous specific details are set forth to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In this description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

The particular equipment, services, sequences of events and types of signals are provided above as examples only. While examples are presented in the context of a VoIP WLAN AP and a GSM cellular network, appropriate modifications may be made to comply with other types of networks and protocols. In addition to a wireless mobile station and a wireless access point, embodiments of the invention may be applied to other types of subscriber equipment including enterprise systems and networks, private and public switched networks and other wired, wireless and hybrid systems that may connect to a UNC or similar device through the Internet or through any other communications medium. In addition to a UNC, embodiments of the invention may be applied to other network devices that interface to a PLMN or PSTN. In addition to a GSM architecture, embodiments of the invention may be applied to other types of telecommunications networks, both wired and wireless, these may include those based on CDMA, TDMA, PCS (Personal Communication Services), PHS (Personal Handyphone System) and other standardized protocols. The protocol architecture diagrams described above are provided as examples only. Many of the layers may be grouped, divided or identified differently to suit a particular application. The components involved in communicating at any particular layer may also be modified to suit a particular application.

It is to be appreciated that a lesser or more equipped UNC, AP, mobile station, private network, and public network than the examples described above may be desirable for certain implementations. Additional or different components, interfaces, buses and capabilities may be used and additional devices may be added to any of these components. Some of the illustrated components may also be removed from the devices. The configuration of the UNC, AP, mobile station, private network, and public network may vary with different implementations depending upon numerous factors, such as price constraints, performance requirements, technological improvements, or other circumstances. It is not necessary that the licensed frequencies be used for a portion of the system nor that unlicensed frequencies be used for a portion of the system. It is further not necessary that a portion of the system be private and another portion be public.

The foregoing description, for purposes of explanation, use specific nomenclature to provide a thorough understanding of the invention. However, it will be apparent to one skilled in the art that the specific details are not required in order to practice the invention. Thus, the foregoing descriptions of specific embodiments of the invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

Throughout this description, acronyms commonly used in the telecommunications industry for wireless services are used along with acronyms specific to the present invention. A table of acronyms follows:

| | |
|---|---|
| AP | Access Point |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CIC | Circuit Identity Code |
| CM | Connection Management |
| CPE | Customer Premises Equipment |
| DTAP | Direct Transfer Application Part |
| GGSN | Gateway GPRS Support Node |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IBS | Indoor Base Station |
| IETF | Internet Engineering Task Force |
| IMSI | International Mobile Station Identification |
| INC | Internet Protocol Network Controller |
| IP | Internet Protocol |
| ISDN | Integrated Services Digital Network |
| ISP | Internet Service Provider |
| MG | Media Gateway |
| MS | Mobile Station |
| MSC | Mobile Switching Center |
| PCM | Pulse Code Modulation |

-continued

| | |
|---|---|
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| RF | Radio Frequency |
| RTCP | Real Time Control Protocol |
| RTP | Real Time Protocol |
| RTP | Real-time Transport Protocol |
| SCCP | Signaling Connection Control Part |
| SDP | Session Description Protocol |
| SGSN | Serving GPRS Support Node |
| SMS | Short Message Service |
| SSL | Secure Sockets Layer |
| TCP | Transmission Control Protocol |
| TDM | Time Division Multiplexing |
| TRAU | Transcoder and Rate Adaptation Unit |
| UDP | User Datagram Protocol |
| UMA | Unlicensed Mobile Access |
| UMAN | Unlicensed Mobile Access Network |
| UMTS | Universal Mobile Telecommunication System |
| UNC | UMA Network Controller (see also INC) |
| VLR | Visited Location Register |
| WLAN | Wireless Local Area Network |

What is claimed is:

1. A method for optimizing a communication channel between first and second media communications clients in a wireless network, the method comprising:

communicatively coupling a licensed wireless first communication network comprising a mobile switching center (MSC) and a second communication network comprising a plurality of network controllers, wherein each of the plurality of network controllers comprises a media gateway;

through the MSC and a media gateway of a network controller, establishing a call between the first media communications client and the second media communications client;

at the MSC, determining that the first and second media communications clients are hosted by the network controller;

sending, from the MSC to the network controller, a set of route optimize messages when the first and second media communications clients are determined to be hosted by the network controller, the set of route optimize messages comprising identities of the first and second media communications clients, the set of route optimize messages indicating that the network controller has to bypass the media gateway;

sending, from the network controller, channel mode modify requests to both the first and second media communications clients to modify the communication channel between the first and second media communications clients to establish a direct media communications connection between the first and second media communications clients through the network controller, wherein the direct media communications connection bypasses the media gateway of the network controller; and receiving, at the MSC, a set of route optimize complete messages from the network controller after the direct media communications connection is established.

2. The method of claim 1, wherein said establishing the direct media communications connection comprises sending session description parameters to the first media communications client that identify the second media communications client.

3. The method of claim 2, wherein the session description parameters comprise an Internet Protocol (IP) port and address of the second media communications client.

4. The method of claim 1, wherein said establishing the direct media communications connection comprises establishing a peer to peer connection between the first and second media communications clients.

5. The method of claim 1, wherein establishing the direct media communications connection comprises modifying an existing channel between the first and second media communications clients through the media gateway to a direct channel between the first and second media communications clients.

6. The method of claim 1, wherein the first and second media communications clients communicate with each other through a security gateway and wherein establishing the direct media communications connection comprises establishing a connection between the first and second media communications clients at the security gateway.

7. The method of claim 1, wherein the first and second media communications clients communicate with each other through a security gateway and wherein establishing the direct media communications connection comprises modifying a connection at the security gateway to exclude the media gateway.

8. A non-transitory machine-readable medium storing a computer program, wherein said non-transitory machine-readable medium does not comprise carrier signals, the computer program comprising sets of instructions which when executed by a mobile switching center (MSC) causes the MSC to perform operations for optimizing a communication channel between first and second media communications clients in a wireless network, the sets of instructions for:

communicatively coupling a licensed wireless first communication network comprising the MSC and a second communication network comprising a plurality of network controllers, wherein each of the plurality of network controllers comprises a media gateway;

establishing a call between the first media communications client and the second media communications client through the MSC and a media gateway of a network controller;

determining that the first and second media communications clients are hosted by the network controller; and sending to the network controller a set of route optimize messages when the first and second media communications clients are determined to be hosted by the network controller, the set of route optimize messages comprising identities of the first and second media communications clients, the set of route optimize messages indicating that the network controller has to bypass the media gateway, the set of route optimize messages causing the network controller to send channel mode modify requests to both the first and second media communications clients to modify the communication channel between the first and second media communication to establish a direct media communications connection between the first and second media communications clients through the network controller, wherein the direct media communications connection bypasses the media gateway of the network controller.

9. The non-transitory machine-readable medium of claim 8, wherein the set of route optimize messages prompts the network controller to send session description parameters to the first media communications client that identify the second media communications client.

10. The non-transitory machine-readable medium of claim 8, wherein the computer program further comprises a set of instructions for receiving a set of route optimize complete messages from the network controller after the direct media communications connection is established.

11. A switching center of a licensed wireless first communication network comprising:
an interface to a network controller of a second communication network corresponding to first and second media communications clients;
a call server configured to:
determine that the first and second media communications clients are hosted by the network controller;
send a set of route optimize messages when the first and second media communications clients are hosted by the network controller, the set of route optimize messages comprising identities of the first and second media communications clients, the set of route optimize messages indicating that the network controller has to bypass a media gateway of the network controller, the set of route optimize messages causing the network controller to send channel mode modify requests to both the first and second media communications clients to modify the communication channel between the first and second media communications clients to establish a direct media communications connection between the first and second media communications clients through the network controller, wherein the direct media communications connection bypasses a media gateway of the network controller; and
receive a set of route optimize complete messages from the network controller after the direct media communications connection is established.

12. The switching center of claim 11, wherein a media communications connection is established through the media gateway for communicating media between the first and second media communications clients and wherein sending the set of route optimize messages comprises sending a message to cause the network controller to reroute the media communications connection to exclude the media gateway.

13. A network controller of a first communication network comprising:
a first interface to a first media communications client;
a second interface to a second media communications client;
a third interface to a mobile switching center (MSC) of a wireless second communication network to carry media communications connections between the first and second media communications clients;
a media gateway configured to communicate media between the first and second media communications clients;
a control server configured to:
(i) receive a set of route optimize messages from the MSC, the set of route optimize messages comprising identities of the first and second media communications clients, the set of route optimize messages indicating that the network controller has to bypass the media gateway, the set of route optimize messages received when the MSC detects that the first and second media communications clients are hosted by the network controller;
(ii) send channel mode modify requests to both the first and second media communications clients to modify a communication channel between the first and second media communications clients and to command the first and second media communications clients to establish a direct media communications connection through the network controller, wherein the direct media communications connection bypasses the media gateway of the network controller; and
(iii) send a set of route optimize complete messages to the MSC after the direct media communications connection is established.

14. The network controller of claim 13, wherein the network controller establishes the direct media communications connection in response to the set of route optimize messages from the MSC.

15. The network controller of claim 13, wherein a media communications connection is established through the media gateway for communicating media between the first and second media communications clients and wherein establishing the direct media communications connection comprises sending channel mode modify requests to both the first and second media communications clients to reroute the media communications connection to exclude the media gateway.

16. The network controller of claim 13, wherein the network controller establishes the direct media communications connection by modifying an existing channel between the first and second media communications clients through the media gateway to a direct channel between the first and second media communications clients that excludes the media gateway.

17. The network controller of claim 13 further comprising a security gateway for communicating messages between the first and second media communications clients and wherein the network controller establishes the direct media communications connection by establishing a connection between the first and second media communications clients at the security gateway.

18. The network controller of claim 13 further comprising a security gateway for communicating messages between the first and second media communications clients and wherein the network controller establishes the direct media communications connection by modifying a connection at the security gateway to exclude the media gateway.

19. A method for optimizing a communication channel between first and second media communications clients in a wireless network, the method comprising:
communicatively coupling a licensed wireless first communication network comprising a mobile switching center (MSC) and a second communication network comprising a plurality of network controllers, wherein each of the plurality of network controllers comprises a media gateway;
through a media gateway of a network controller and the MSC, establishing a call between the first media communications client and the second media communications client;
receiving, at the network controller, a set of route optimize messages from the MSC, the set of route optimize messages comprising identities of the first and second media communications clients, the set of route optimize messages indicating that the network controller has to bypass the media gateway, the set of route optimize messages received when the MSC detects that the first and second media communications clients are hosted by the network controller;
sending, from the network controller, channel mode modify requests to both the first and second media communications clients to modify the communication channel between the first and second media communications clients and to command the first and second media communications clients to establish a direct media communications connection through the network controller, wherein the direct media communications connection bypasses the media gateway of the network controller; and sending, from the network controller, a set of route optimize complete messages to the MSC after the direct media communications connection is established.

20. The method of claim 19, wherein the channel mode modify request to the first media communications client comprises a first request for the first media communications client to connect directly with the second media communications client, the first request comprising a session description protocol for the second media communications client, and wherein the channel mode modify request to the second media communications client comprises a second request for the second media communications client to connect directly with the first media communications client, the second request comprising a session description protocol for the first media communications client.

21. The method of claim 20, wherein the session description protocols of the first and second media communications clients are stored by the network controller.

22. The method of claim 20, wherein the session description protocol of a media communications client comprises an Internet Protocol (IP) port and address of the media communications client.

* * * * *